United States Patent [19]

Burke

[11] 4,268,315
[45] May 19, 1981

[54] BRIQUETTE FORMING PROCESS AND COMPOSITION

[76] Inventor: Michael T. Burke, 1614 Monroe St., Waukegan, Ill. 60048

[21] Appl. No.: 135,515

[22] Filed: Mar. 31, 1980

[51] Int. Cl.³ .............................................. C04B 35/00
[52] U.S. Cl. ........................................ 106/84; 106/68; 252/71; 264/26; 264/109
[58] Field of Search ................... 106/84, 68, DIG. 8; 252/71; 264/109, 25, 26

[56] References Cited

U.S. PATENT DOCUMENTS

| | | | |
|---|---|---|---|
| 2,493,693 | 1/1950 | Parkinson | 106/84 X |
| 3,669,889 | 6/1972 | Juzvuk et al. | 252/71 |
| 4,219,361 | 8/1980 | Sutton et al. | 264/25 X |

OTHER PUBLICATIONS

Engelleitner, W. H.–"Pellets Cut Cost –Improve Quality", The Glass Industry–Mar. 1972, pp. 8–10 and 30.

*Primary Examiner*—Helen M. McCarthy
*Attorney, Agent, or Firm*—Robert E. O'Neill

[57] ABSTRACT

A process for forming an improved briquette for use with gas-fired grills and the like. A briquette is formed from a mixture consisting essentially of sand and the following percentages of materials based on the weight of the sand: about 1% water; 5%-15% ball clay, bentonite, or other suitable alternatives; 0.25%-2% iron oxide for coloring; 3%-8% sodium aluminate; and 5%-12% sodium silicate, preferably grade #40. Individual briquettes formed from this mixture retain heat in gas grills for aiding the cooking process. The briquettes are placed in the grill and heated prior to cooking. Thereafter, the briquettes maintain cooking temperatures even after the gas is turned lower and for a time period after the gas flame is removed.

15 Claims, No Drawings

BRIQUETTE FORMING PROCESS AND COMPOSITION

BACKGROUND OF THE INVENTION

The present invention relates to improved articles for use in cooking grills and more particularly, to an improved briquette for maintaining cooking temperatures in gas grills and the like.

In the prior art there are known a variety of compositions which are used to form articles for use in retaining heat during cooking. Such articles or briquettes are generally used with gas grills and similar cooking appliances for storing the heat provided by the gas flame or other source of heating energy. The briquettes are designed to improve the distribution of heat to aid in the cooking process.

Generally the briquettes or composition are placed adjacent the heating source in the cooking appliance and heated directly by the energy source until a predetermined temperature is reached. At that time the primary energy source is reduced to a value sufficient to maintain the briquettes at the temperature desired for cooking. Food is then placed on a grill adjacent the article and cooked in a normal manner until done.

Naturally, the briquettes used to store and retain the heat must be made of a material that will store heat yet be sturdy enough to withstand the effects of high temperatures and wide heat variations. In addition, the briquette composition must be of such construction as to withstand the rough handling that usually occurs in the making, transporting and use of the briquettes. They must also be constructed so that they are easily cleaned since their use is generally in an environment which subjects them to contact with grease and various food substances.

While a variety of materials have been proposed and used, the same suffer from deficiencies in durability and efficiency. Many items are constructed of odd, angular and porous compositions which lend themselves to breakage, retention of food substances, and less efficient retention of heat from the energy source. Others, while more aesthetically and functionally appealing, are of insufficient durability to withstand the high temperatures and rough treatment to which they are subjected during use. As a result, there is still a great need for new compositions and processes for forming briquettes for use in such environments and which are of increased durability and energy efficiency.

Accordingly, the present invention has been developed to overcome the specific shortcomings of the above known and similar compositions and techniques, and, more particularly, to provide more economical, energy efficient, and long-lasting briquettes.

SUMMARY OF THE INVENTION

In accordance with the present invention, an improved briquette for use in cooking and heating is formed by mixing a given weight of sand and the following percentages of additional materials based on the weight of the sand: about 1% water, 5%–15% ball clay, bentonite, or other equivalent material; 0.25%–2% iron oxide for coloring; 3%–8% sodium aluminate; and 5%–12% sodium silicate. The composition is formed by mixing the sand and water until a uniform consistency is obtained and then by adding and mixing the remaining percentages until a substantially homogeneous composition is obtained. The mixture is then passed through a conventional compacting machine which forms the individual briquettes by compacting predetermined quantities of the mixture. The individual briquettes are then subjected to a heating process for a time sufficient to complete the drying of the briquettes in their final form.

The completed briquettes may be used in connection with any heating or cooking process where it is desired to retain heat from an energy source. Typically, the briquettes may be used with a gas grill to provide uniform heating during cooking and more energy efficient use of the heating grill. In such an instance the briquettes are first heated to a predetermined temperature by a gas flame within the grill. Once that temperature has been reached, the flame in the grill can be reduced to a lower level which is sufficient to maintain the temperature of the briquettes at the selected temperature. Food can then be cooked from the heat radiated by the briquettes without as much energy loss as would be incurred from direct cooking from the gas flames.

It is a feature of the present invention to provide an improved composition for use in forming heating briquettes.

It is another feature of the invention to provide an improved process for forming briquettes for use in heating and cooking.

Another feature of the invention is to provide an efficient and economical briquette composition for maintaining cooking temperatures.

Still another feature of the invention is to provide an improved process for forming a briquette which is less complex and more economical in practice.

Other advantages and novel features of the invention will become apparent from the following detailed description.

DETAILED DESCRIPTION OF A PREFERRED EMBODIMENT

Generally, the use of briquettes to aid in heating and cooking processes has been known for some time. Such briquettes are conventionally used in gas grills and similar appliances where it is desired to provide a more efficient and uniform heating. As has been noted, a variety of prior techniques have used articles of different compositions as briquettes for retaining the heat from a gas or similar energy source. The compositions have taken a variety of forms, including irregularly shaped and porous materials. When used with the gas grill, the articles or briquettes are first heated with the gas flame to a predetermined temperature. The gas flame is then reduced to a setting sufficient to maintain the briquettes at the set temperature while the radiant heat from the briquette is used as the primary source of heat energy for cooking.

As can be seen, the cost and efficiency of the heating process is to a large extent dependant upon the particular composition and characteristics of the briquettes used to retain the heat of the energy source. In addition, the briquettes must be formed to withstand an environment which includes high temperatures and repeated heating and cooling cycles. Further, the briquettes are subjected to various grease and food substances during cooking and to relatively rough handling prior to their use in the grill itself. Such briquettes must therefore be durably constructed to withstand the adverse treatment during its common use.

In accordance with the present invention, an improved process is used to form a novel briquette which has improved characteristics over that commonly found in the prior art. The process includes the mixing of sand and a specific amount of various other materials by weight of the sand to produce a mixture which can then be formed and molded into a briquette. In the process, a specific quantity of sand by weight is initially selected. Preferably, silica sand is used and is selected to have a variety of particle sizes to make the composition of the final briquette more aesthetically appealing. The sand, for example, may have a plurality of particle sizes within the range of screen size 8 to screen size 350.

After the sand has been selected and weighed, a quantity of water is added which has a weight equal to about 1% of the weight of sand. At this time, the sand and water are mixed to form a composition of substantially uniform consistency. Thereafter, the following percentages of materials by weight of the sand are added individually to the water-sand mixture and combined to form a substantially homogeneous composition of uniform consistency: 5%-15% ball clay (pottery clay), bentonite, or other equivalent alternative; 0.25%-2% iron oxide for coloring the mixture black or reddish-brown; 3%-8% sodium aluminate; and 5%-12% sodium silicate, preferably grade #40.

In forming the composition, the preferable percentage of each of the materials within the noted ranges is determined to a large extent by the particle sizes of the sand. By way of example, if there is a large percentage of fine grain sand particles in the composition, lower percentages of clay within the stated range can be used to produce the desired briquette product. Naturally, when a greater percentage of the sand grains are larger, the higher percentage of clay within the stated range should be used. The most desirable percentage within a given range can easily be determined with minimal testing of samples until the desired briquette is obtained.

The size of the sand particles also affects the percentage of sodium silicate and sodium aluminate that must be used within the indicated ranges in a manner similar to that described above. Thus, with minimal testing of samples, the most desirable percentage within a given range can be easily ascertained.

After the water, the sand and the remainder of the above materials have been mixed, the composition is ready for forming the briquettes. Specific quantities of the composition are inserted into a compacting machine which molds and forms those quantities under pressure to form the individual briquette. Typically, the compacting machine can be any device which will provide a pressure of 500 lbs. per square inch—80 tons per square inch to mold the specific quantity and compress it into a briquette of desired configuration. Following compression or compaction, the individual briquettes are allowed to dry by self-curing or dried by any process which allows the composition to harden and thereby form the completed briquette. Typically, the compacted briquettes can be dried by exposure in a heat tunnel to a temperature of 500° F. for a period of 3½ minutes. Alternatively, the briquette can be exposed to microwave energy at a value capable of producing the same drying as the heat tunnel. In still other instances, the briquettes can be packaged and shipped and allowed to dry by self-curing or by heating in the appliance with which they are used.

After drying, the final briquette generally has a composition consisting essentially of sand and the following materials by weight of the sand: 5%-15% ball clay (pottery clay), bentonite, or equivalent alternative; 0.25%-2% iron oxide; 3%-8% sodium aluminate; and 5%-12% sodium silicate. These briquettes can then be used in a gas grill or similar heating or cooking appliance to retain heat and provide a uniform and more efficient source of radiant heat during cooking. More specifically, during compaction the briquettes are formed to have symmetrical configurations having relatively smooth outer surfaces. Preferably, the briquettes are formed to have a circular shape, but may be formed in any configuration which provides smooth and regular surfaces and which is generally symmetrical. The above disclosed inventive process and composition facilitates the formation of these smooth surfaces during the compaction process.

In use, the briquettes are placed on a grate beneath the grill in a gas or similar cooking appliance and maintained adjacent to the gas flame. Initially, the gas flames are regulated to heat the briquettes to a predetermined temperature, at which time the gas flame can be lowered to a value sufficient to maintain the briquettes at that predetermined temperature. Once heated, the briquettes maintain their temperature and, if evenly distributed across the grating, will provide a generally uniform source of radiant heat for cooking. Food can then be placed on a grill above the briquettes and cooked in a more uniform and efficient fashion.

Using the present process and composition, the final briquette is considered to be more efficient in operation and economical in cost. The briquette retains the heat initially provided by the gas flame even after it is turned down, thereby allowing more efficient energy use in cooking. In addition, during cooking, grease or other food substances often falls and fouls the surfaces of the briquettes. When briquettes with porous or irregular surfaces are used, the grease and other matter collects and fouls the surfaces of the briquette and reduces their heating efficiency.

In accordance with the present invention, however, the particular composition and the smooth and regular configuration of the briquette facilitates easy removal of any such collected grease or other foreign matter. Specifically, the briquettes can be arranged over the gas flame and heated until the foreign material is burned off of one side. The briquettes can then be turned over and the same process repeated to remove the foreign material from the other side. This heating process can be repeated until all, or substantially all, foreign material has been removed, thereby providing an aesthetically appealing briquette and removing foreign matter which would cause inefficiency during cooking.

As can be seen from the above description, the present invention provides a briquette which exhibits various advantages for allowing improved cooking and heating and operation of gas grills and similar appliances. The process and composition forming the briquettes provides a durable and inexpensive item which can withstand the rigors to which the briquette is subjected. It is capable of being subjected to high temperatures and repeated heating and cooling cycles as well as to repetitive cleaning operations to remove foreign matter. Additionally, the composition improves the efficiency of the heating process during cooking and allows more efficient use of energy in connection therewith.

Although the invention has been described with particular reference to its use with gas grills, it is obvious that the briquettes can be used in similar appliances and for other heating purposes where it is desired to provide an efficient and uniform heating source. In addition, other modifications and variations of the present invention are possible in light of the above teachings. It is therefore to be understood that within the scope of the appended claims, the invention may be practiced otherwise than as specifically described.

I claim:

1. A process for forming an improved briquette composition for use in heating comprising:
   selecting a quantity of sand having a predetermined weight;
   adding approximately 1% water by weight of the sand to the sand;
   mixing the sand and water;
   adding the following percentages of materials by weight of the sand to the sand and water mixture;
   5%–15% ball clay, bentonite, or equivalent alternative;
   0.25%–2% iron oxide;
   3%–8% sodium aluminate;
   5%–12% sodium silicate; and
   mixing the added materials with the sand and water mixture to form a briquette composition.

2. The process of claim 1 wherein said mixing steps comprise mixing the materials to form a substantially homogeneous composition of uniform consistency.

3. The process of claim 1 wherein the sand is silica sand.

4. The process of claim 3 wherein the silica sand is selected to have a variety of particle sizes within the range of screen size 8 to screen size 350.

5. The process of claim 1 wherein the sodium silicate is selected to be grade #40.

6. The process of claim 1 further including the step of compacting predetermined quantities of said briquette composition to form individual briquettes.

7. The process of claim 6 wherein said compacting step comprises compacting each predetermined quantity of briquette composition under a pressure of 500 lbs. per square inch to 80 tons per square inch.

8. The process of claim 6 further including the step of heating each individual briquette for a time sufficient to complete drying of the briquette.

9. The process of claim 6 further including the step of subjecting each of the individual briquettes to microwave energy to cause drying of the briquettes.

10. An improved briquette for use in heating wherein the briquette consists essentially of a predetermined quantity of sand and the following materials by weight of the sand:
    5%–15% ball clay, bentonite, or suitable equivalent;
    0.25% to 2% iron oxide;
    3%–8% sodium aluminate; and
    5%–12% sodium silicate.

11. The composition of claim 10 wherein the sand is silica sand having a variety of particle sizes.

12. The composition of claim 10 wherein the sodium silicate is grade #40.

13. The composition of claim 10 wherein the composition is formed as a briquette by subjecting the composition to a pressure in excess of 500 lbs. per square inch.

14. The composition of claim 13 wherein the briquette is formed as a symmetrical article with substantially smooth surfaces.

15. The composition of claim 14 wherein the briquette has a circular configuration.

* * * * *